(12) United States Patent
Mola

(10) Patent No.: US 10,180,799 B2
(45) Date of Patent: Jan. 15, 2019

(54) EFFICIENT RETRIEVAL OF MEMORY VALUES DURING TRACE REPLAY

(71) Applicant: MICROSOFT TECHNOLOGY LICENSING, LLC, Redmond, WA (US)

(72) Inventor: Jordi Mola, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 91 days.

(21) Appl. No.: 15/423,030

(22) Filed: Feb. 2, 2017

(65) Prior Publication Data
US 2018/0217768 A1    Aug. 2, 2018

(51) Int. Cl.
| | |
|---|---|
| *G06F 11/36* | (2006.01) |
| *G06F 3/06* | (2006.01) |
| *G06F 12/0808* | (2016.01) |
| *G06F 12/128* | (2016.01) |

(52) U.S. Cl.
CPC ............ *G06F 3/0619* (2013.01); *G06F 3/065* (2013.01); *G06F 3/067* (2013.01); *G06F 11/362* (2013.01); *G06F 11/3636* (2013.01); *G06F 12/0808* (2013.01); *G06F 12/128* (2013.01); *G06F 2212/69* (2013.01)

(58) Field of Classification Search
CPC ............ G06F 11/3636; G06F 11/3664; G06F 11/362; G06F 11/3688; G06F 2201/865; G06F 11/3471; G06F 3/0619; G06F 3/065
USPC .................... 711/154; 717/127; 714/E11.212
See application file for complete search history.

(56) References Cited

U.S. PATENT DOCUMENTS

| | | | |
|---|---|---|---|
| 6,901,581 B1 | 5/2005 | Schneider | |
| 8,423,965 B2 | 4/2013 | Goel et al. | |
| 8,832,682 B2 | 9/2014 | Xu et al. | |
| 8,914,777 B2 | 12/2014 | Lindahl et al. | |

(Continued)

FOREIGN PATENT DOCUMENTS

EP    3093768 A2    11/2016

OTHER PUBLICATIONS

Narayanasamy, et al., "Bugnet: Recording Application-Level Execution for Deterministicreplay Debugging", In Journal of IEEE Micro, vol. 26, Issue 1, Jan. 2006, pp. 100-109.

(Continued)

*Primary Examiner* — Hashem Farrokh
(74) *Attorney, Agent, or Firm* — Workman Nydegger

(57) ABSTRACT

Preserving memory values during replay includes identifying trace sections that each represents events executed by an entity over a period of time. A parallel replay of trace sections is performed at a plurality of processing units. While performing the parallel replay, a persistence data structure corresponding to each trace section is maintained. This includes, for each trace section, storing, in the trace section's persistence data structure, a record of each memory address consumed by the processing unit while replaying the trace section, and a most recent memory value stored at each memory address. Returning a memory value during replay includes identifying relevant persistence data structures, and searching these data structures, in turn, based on a defined ordering. When a relevant memory address is identified during the search, the search is ceased and the value associated at the memory address, as stored in a persistence data structure, is returned.

20 Claims, 7 Drawing Sheets

(56) References Cited

U.S. PATENT DOCUMENTS

| 8,935,673 | B1 | 1/2015 | Ashkenazi et al. | |
|---|---|---|---|---|
| 2007/0168989 | A1* | 7/2007 | Edwards | G06F 11/3636 |
| | | | | 717/127 |
| 2015/0378870 | A1 | 12/2015 | Marron et al. | |
| 2016/0246465 | A1* | 8/2016 | Nguyen | G06F 11/3414 |
| 2016/0283354 | A1* | 9/2016 | Lantz | G06F 11/3688 |

OTHER PUBLICATIONS

Saito, Yasushi, "Jockey: A User-space Library for Record-replay Debugging", In Proceedings of the Sixth International Symposium on Automated Analysis-Driven Debugging, Sep. 19, 2005, pp. 69-76.

Khanse, Anand, "Microsoft Time Travel Tracing Diagnostic Tool", http://www.thewindowsclub.com/microsoft-time-travel-tracing-diagnostic, Published on: Jul. 21, 2013, 6 pages.

Patil, et al., "PinPlay: A Framework for Deterministic Replay and Reproducible Analysis of Parallel Programs", In Proceedings of the 8th Annual IEEE/ACM International Symposium on Code Generation and Optimization, Apr. 24, 2010, pp. 2-11.

Lee, et al., "Offline Symbolic Analysis for Multi-Processor Execution Replay", In Proceedings of the 42nd Annual IEEE/ACM International Symposium on Microarchitecture, Dec. 12, 2009, pp. 564-575.

Becker, et al., "Synchronizing the Timestamps of Concurrent Events in Traces of Hybrid MPI/OpenMP Applications", IEEE International Conference on Cluster Computing, Sep. 2010, 10 Pages.

Bhansali, et al., "Framework for instruction-level tracing and analysis of program executions", In Proceedings of the 2nd international conference on Virtual execution environments., Jun. 14, 2006, pp. 154-163.

Doudalis, et al., "HARE: Hardware Assisted Reverse Execution", The Sixteenth International Symposium on High-Performance Computer Architecture, Jan. 9, 2010, 5 Pages.

"International Search Report and Written Opinion Issued in PCT Application No. PCT/US2018/015628", dated Sep. 7, 2018, 23 Pages.

* cited by examiner

EFFICIENT RETRIEVAL OF MEMORY VALUES DURING TRACE REPLAY

BACKGROUND

When writing code during the development of software applications, developers commonly spend a significant amount of time "debugging" the code to find runtime and other source code errors. In doing so, developers may take several approaches to reproduce and localize a source code bug, such as observing behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging applications ("debuggers") have been developed in order to assist developers with the code debugging process. These tools offer developers the ability to trace, visualize, and alter the execution of computer code. For example, debuggers may visualize the execution of code instructions, may present code variable values at various times during code execution, may enable developers to alter code execution paths, and/or may enable developers to set "breakpoints" and/or "watchpoints" on code elements of interest (which, when reached during execution, causes execution of the code to be suspended), among other things.

An emerging form of debugging applications enable "time travel," "reverse," or "historic" debugging. With "time travel" debugging, execution of a program (e.g., executable entities such as threads) is recorded/traced by a trace application into one or more trace files. These trace file(s) can then be used to replay execution of the program later, for both forward and backward analysis. For example, "time travel" debuggers can enable a developer to set forward breakpoints/watchpoints (like conventional debuggers) as well as reverse breakpoints/watchpoints.

One challenge in implementing "time travel" debuggers involves how to return a memory value at a given point in a trace. One approach is to record a full copy of addressable memory of an executable entity at trace time, often using the same memory addresses that were seen by the executable entity at trace time. Then, replay involves loading this full memory copy, and performing memory reads and writes directly into it. Using this approach, reproducing memory values at a particular point involves reading the value from the memory copy. However, this approach produces prohibitively large amount of data at trace time (since a full copy of addressable memory is stored), and requires this large amount of data to be loaded at replay time. Furthermore, requiring maintenance of a large memory copy at replay time makes it impractical to perform parallel or speculative replay operations, and to store the values of memory at multiple particular points in time (for later retrieval).

Another approach is to replay code up to the last point that a memory address of interest was consumed prior to the point of interest in the trace, and return the value seen at that address. This has an advantage over the previous approach of using much less memory at replay time, but it introduces complexity and leads to poor performance for returning memory values, since a replay is performed in response to every request for a memory value.

BRIEF SUMMARY

At least some embodiments described herein preserve memory values during trace replay by maintaining plurality of persistence data structures during trace replay. Each persistence data structure corresponds to a different trace section of a trace, and stores the most recently seen value for each memory address encountered by that trace section. At least some embodiments herein also use the persistence data structures to return a memory value during trace replay. In these embodiments, returning a memory value involves progressively searching these persistence data structures—starting at the point of time of the requested memory value and going backwards until a persistence data structure storing the memory address of the requested memory value is encountered.

The foregoing embodiments provide advantages over prior approaches, including providing responsive performance for requests for memory values, while requiring a relatively small amount of memory information to be maintained during replay, and enabling low-cost mechanisms for storing the values of memory at multiple points in time.

For example, an embodiment of a method for preserving memory values during trace replay includes identifying, from among a plurality of trace data streams, a plurality of trace sections that each represents one or more events executed by an executable entity over a period of time. The method also includes performing a parallel replay of two or more of the plurality of trace sections at the plurality of processing units, including concurrently replaying each trace of the two or more trace sections at a different processing unit of the plurality of processing units. The method also includes, while concurrently replaying each trace section at a different processing unit, maintaining a different persistence data structure corresponding to each trace section. This includes, for each trace section, storing in the trace section's corresponding persistence data structure a record of each memory address consumed by the processing unit while replaying the trace section, and a most recent memory value stored at each memory address during replay of the trace section.

As another example, an embodiment of a method for returning a memory value during trace replay includes identifying, in a particular trace data stream, an event for which a memory value at a memory address associated with the event is requested. The method also includes identifying a defined ordering among a plurality of trace sections across a plurality of trace data streams that include the particular trace data stream. The method also includes identifying a plurality of persistence data structures that are each associated with a different trace section, and that occur prior to the location in the trace data stream based on the defined ordering. The method also includes identifying an ordering among the plurality of persistence data structures based on the defined ordering. The method also includes searching, in turn, and based on the identified ordering among the plurality of persistence data structures, one or more of the plurality of persistence data structures until the memory address is identified in a particular persistence data structure. When the memory address is identified in the particular persistence data structure, the method includes ceasing further searching of the plurality persistence data structures, and returning the value associated at the memory address, as stored in the particular persistence data structure.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein preserve memory values during trace replay by maintaining plurality of persistence data structures during trace replay. Each persistence data structure corresponds to a different trace section of a trace, and stores the most recently seen value for each memory address encountered by that trace section. At least some embodiments herein also use the persistence data structures to return a memory value during trace replay. In these embodiments, returning a memory value involves progressively searching these persistence data structures—starting at the point of time of the requested memory value and going backwards until a persistence data structure storing the memory address of the requested memory value is encountered.

Figure 1:
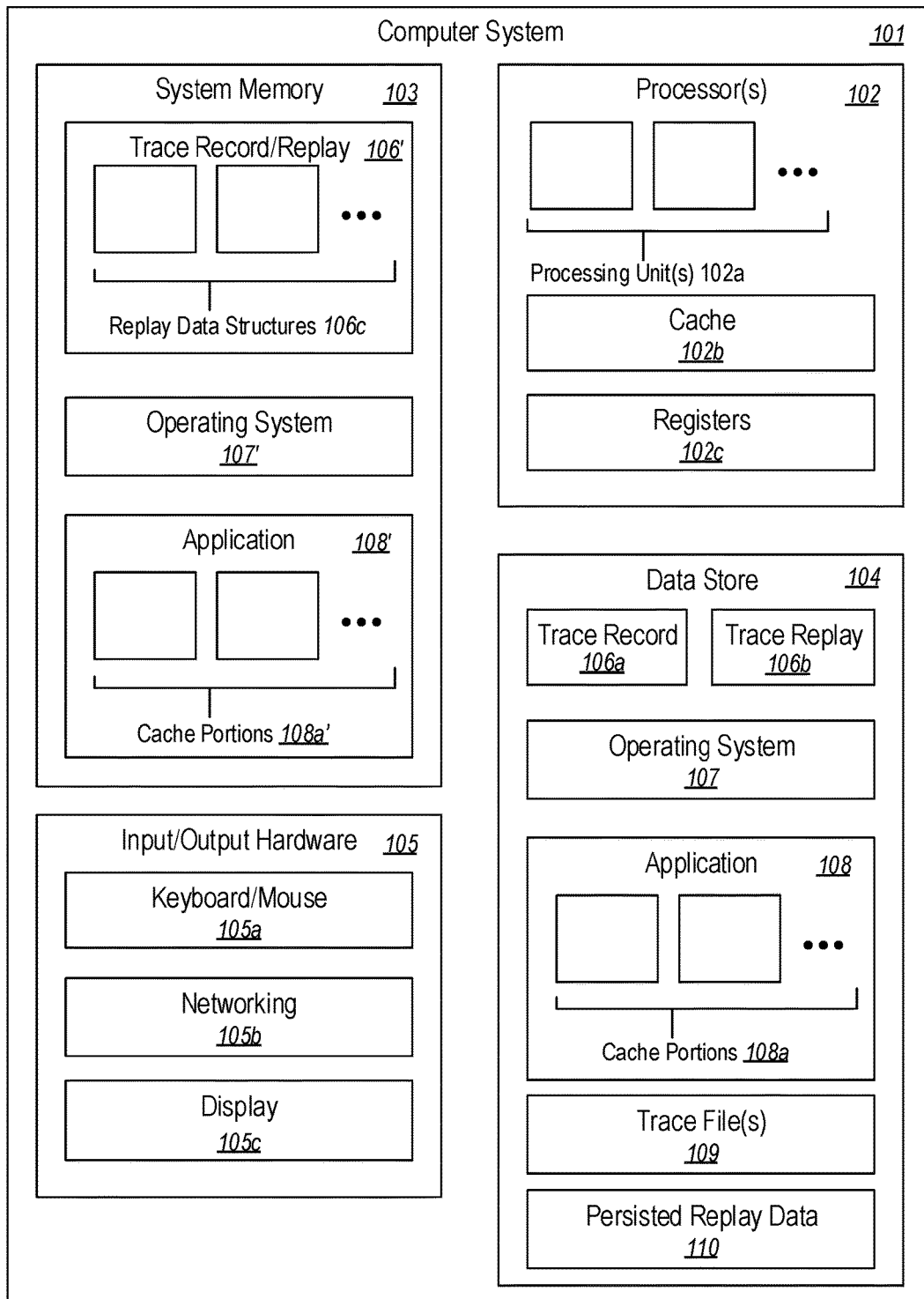
FIG. 1 illustrates an example computing environment that facilitates preserving memory values during replay of trace files, and efficient retrieval of those memory values.

To the accomplishment of the foregoing, FIG. 1 illustrates an example computing environment 100 that facilitates preserving memory values during replay of trace files, and efficient retrieval of those memory values. As depicted, embodiments may comprise or utilize a special-purpose or general-purpose computer system 101 that includes computer hardware, such as, for example, one or more processors 102, system memory 103, one or more data stores 104, and/or input/output hardware 105 (e.g., such as the depicted keyboard/mouse hardware 105a, networking hardware 105b, and display device 105c). In some embodiments, computer system 101, and the components therein, could comprise a virtualized environment.

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 101 to implement the disclosed functionality of the invention. Thus, for example, computer storage devices may include the depicted system memory 103, the depicted data store 104 which can store computer-executable instructions and/or data structures, or other storage such as on-processor storage, as discussed later.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 105 may comprise networking hardware 105b (e.g., a hard-wired or wireless network interface module) that connects a network and/or data link that can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within networking hardware 105b, and then eventually transferred to the system memory 103 and/or to less volatile computer storage devices (e.g., data store 104) at the computer system 101. Thus, it should be understood that computer storage devices can be included in computer system components that also (or even primarily) utilize transmission media.

Computer-executable instructions comprise, for example, instructions and data which, when executed at the processor(s) 102, cause the computer system 101 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

The data store 104, which typically comprises durable storage, can store computer-executable instructions and/or data structures representing application code such as, for example, a trace record component 106a, a trace replay component 106b, an operating system 107, and an application 108 (including portions of executable code 108a of the application 108). The data store 104 can also store other types of data, such as one or more trace file(s) 109 and persisted replay data 110. When application code is executing (e.g., using the processor(s) 102), the system memory 103 can store corresponding runtime data, such as runtime data structures, computer-executable instructions, etc. Thus, FIG. 1 illustrates the system memory 103 as including runtime record/replay data 106' (including replay data structures 106c), runtime operating system data 107', and runtime application data 108' (including runtime variables, data structures, etc. of application 108 as it executes, as well as runtime code portions 108a' which are in-memory copies of code portions 108a).

The trace record component 106a is usable to trace execution of an application, such as application 108 (including its executable code portions 108a), and to store trace data in the trace file(s) 109. In some embodiments, the trace record component 106a is a standalone application, while in other embodiments it is integrated into another software component, such as the operating system 107, a hypervisor, a debugging suite, etc. The trace record component 106a may also exist at an entirely different computer system. Thus, the trace record component 106a may trace execution of code at another computer system. Then, the trace file(s) 109 resulting from that tracing can be transferred (e.g., using the networking hardware 105b) to the computer system 101 for replay by the trace replay component 106b. While the trace file(s) 109 are depicted as being stored in the data store 104, they may also be recorded exclusively or temporarily in the system memory 103, or at some other storage device.

FIG. 1 also includes a simplified representation of the internal hardware components of the processor(s) 102. As illustrated, each processor 102 includes processing unit(s) 102a. Each processing unit may be physical (i.e., a physical processor core) and/or logical (i.e., a logical core presented by a physical core that supports hyper-threading, in which more than one application thread executes at the physical core). Thus, for example, even though the processor 102 may in some embodiments include only a single physical processing unit (core), it could include two or more virtual processing units 102a presented by that single physical processing unit.

Each processing unit 102a executes processor instructions that are defined by applications (e.g., trace record component 106a, trace replay component 106b, operating system 107, application code portions 108a, etc.), and which instructions are selected from among a predefined processor instruction set architecture. The particular instruction set architecture of each processor 102 varies based on processor manufacturer and processor model. Common instruction set architectures include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other instruction set architectures exist and can be used by the present invention. In general, an "instruction" is the smallest externally visible (i.e., external to the processor) unit of code that is executable by a processor.

Each processing unit 102a obtains processor instructions from a shared processor cache 102b (i.e., shared by the processing units 102a), and executes the processor instructions based on data in the shared cache 102b, based on data in registers 102c, and/or without input data. In general, the shared cache 102b is a small amount (i.e., small relative to the typical amount of system memory 103) of random-access memory that stores on-processor copies of portions of the system memory 103. For example, when executing the executable code portions 108a of application 108, the shared cache 102b stores a subset of the runtime code portions 108b' in a code cache section of the shared cache 102b, and stores other runtime application data 108' (e.g., variables, data structures, etc.) in a data cache section of the shared cache 102b. If the processing unit(s) 102a require data not already stored in the shared cache 102b, then a "cache miss" occurs, and that data is fetched from the system memory 103 (potentially evicting some other data from the shared cache 102b). The registers 102c are hardware based storage locations that are defined based on the instruction set architecture of the processors(s) 102.

The trace replay component 106b replays one or more trace file(s) 109 by executing the code of the executable entity upon which the trace file(s) 109 are based at the processor(s) 102, while supplying that code with traced data (e.g., register values, memory values, etc.) from the trace file(s) 109 at appropriate times. Thus, for example, the trace record component 106a may record execution of one or more code portions 108a of application 108 at the processor(s) 102, while storing trace data (e.g., memory values read by code instructions, register values supplied code instructions, etc.) in the trace files(s) 109. Then, the trace replay component 106b can re-execute the code portion(s) 108a at the processor(s) 102, while supplying that code with the trace data from the trace files(s) 109 so that the code is executed in the same manner that it was at trace time.

The trace replay component 106b also maintains a plurality of persistence data structures that each store the most recent value of each memory address accessed (i.e., read from or written to) a corresponding trace section of the trace file 109. This is described in connection with the detailed trace replay component 200 of FIG. 2, and the environment 300 of FIG. 3.

Figure 2:
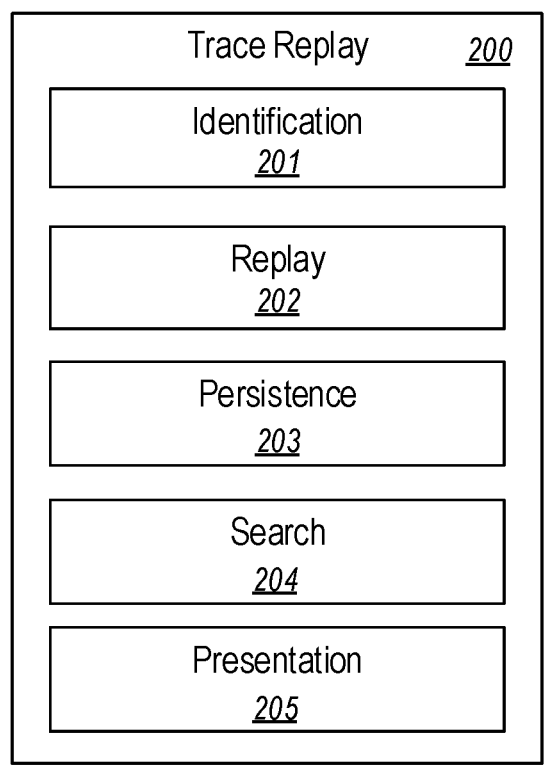
FIG. 2 illustrates details of an example replay component.

FIG. 2 illustrates details of an example replay component 200, such as the trace replay component 106b of FIG. 1. As depicted in FIG. 2, the trace replay component 200 can include a number of sub-components, such as, for example, an identification component 201, a replay component 202, a persistence component 203, a search component 204, and/or a presentation component 205. The depicted identity and arrangement of sub-components 201-205 are merely one example as an aide in description, and one of ordinary skill in the art will recognize that the particular identity and number of sub-components of the trace replay component 200 can vary greatly based on implementation.

The identification component 201 is responsible for identifying executable events in a trace file and memory locations of interest, for identifying trace sections of interest in order to obtain a memory value for a memory location of interest, for identifying an ordering among trace sections, and/or for identifying persistence data structures that are of interest for corresponding trace sections, etc. These concepts will be described in more detail herein after.

The replay component 202 performs trace replay operations, such as instructing one or more processing units 102a to execute instructions from traced code portions 108a, while supplying those code portions with data from a trace file 109. As is described in more detail later in connection with FIG. 3, this may include instructing one or more processing units 102a to perform reads from and/or writes to system memory 103 through a cache.

The persistence component 203 causes memory addresses and their corresponding values to be persisted to one or more persistence data structure(s) at various times during a trace replay. Persistence data structure(s) may, for example, be an in-memory replay data structure 106c, or may be stored on disk (e.g., persisted replay data 110). These persistence data structure(s) are then usable by the search component 204 to obtain desired memory values at specified times in the trace execution. These memory values can then be displayed using a presentation component 205 (e.g., such as at debugger user interface).

Figure 3:
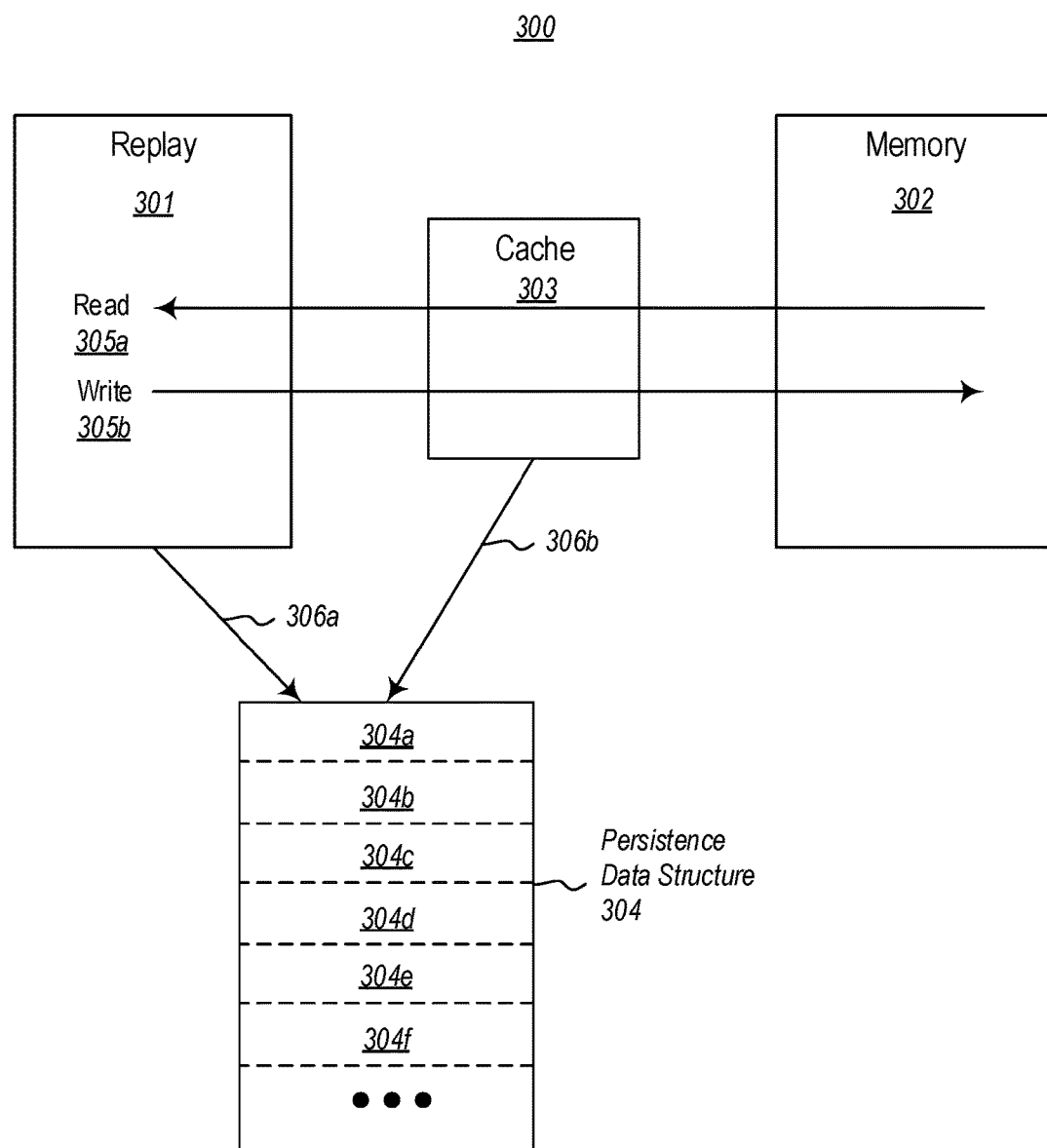
FIG. 3 illustrates an example environment for preserving memory values during replay of trace files using a cache and a persistence data structure.

In the context of FIGS. 1 and 2, FIG. 3 illustrates an example environment 300 for preserving memory values during replay of trace files using a cache and persistence data structures. In particular, the embodiment 300 of FIG. 3 illustrates a replay component 301 (e.g., such as the trace replay component 106b of FIG. 1 and/or the trace replay component 200 of FIG. 2) that causes read 305a and/or write 305b operations to be performed on a memory 302 (e.g., by a processing unit 102a of FIG. 1). The memory 302 may comprise a portion of system memory 103 of FIG. 1, such as runtime application data 108'. In some embodiments, the memory 302 comprises a data structure maintained by the replay component 301 (e.g., such as one of the replay data structures 106c) that reproduces the memory reads and/or writes actually observed during a trace. Thus, for example, the memory 302 may comprise a replay data structure 106c comprising an entire copy of memory that was addressable by the executable entity being traced, a cache data structure that reproduces the reads seen by the entity being traced, etc.

The memory 302 could include both memories storing the code of the executable entity (e.g., a code portion 108a') as well as operating memory used by the code of the executable entity. Thus, a read 305a operation may comprise a code read by a processing unit 102a that obtains executable instructions from the memory 302, and/or a data read by a processing unit 102a that obtains runtime data (e.g., variables or other data structures) stored in the memory 302. A write 305b operation may comprise a data write that stores runtime data in the memory 302. While FIG. 3 depicts read 305a and write 305b operations, it will be appreciated that, when a memory access operation is accessing code data, a processor may treat the operation as an "execute" or a "fetch" operation. As used in this description and in the claims, a read 305a operation should be construed to comprise an "execute" and/or a "fetch" memory access operation in appropriate circumstances, such as when the operation is accessing code data.

As depicted in FIG. 3, the replay component 301 (e.g., replay component 202) causes the read 305a and write 305b operations to be performed through a cache 303. In general, the cache 303 operates in a similar manner to a processor cache (e.g., cache 102b of FIG. 1), and in some embodiments it is in fact at least a portion of the processor cache 102b (whether that be physical or virtualized). Thus, in general, the cache 303 stores a plurality of cache lines, each of which can be associated with a memory address (e.g., in system memory 103), and store a cached copy of a portion of memory starting at that memory address and potentially spanning several memory addresses (depending on the size of the cache line).

FIG. 3 also illustrates persistence data structures 304, which includes a plurality of individual persistence data structures. For example, FIG. 3 illustrates six individual persistence data structures 304a-304f, though the ellipses indicate that persistence data structures 304 can include any number of individual persistence data structures. Depending on implementation, the individual persistence data structures may be each individually independent, or may be related in some way, such as part of a linked list, part of a hierarchical structure, indexed by a common hash table, etc. to make up the overall persistence data structure 304.

In general, the persistence data structures 304 are used by the replay component 301 (e.g., using persistence component 203) to store the values of memory addresses that are encountered by the code that is being replayed by the replay component 202. Thus, the persistence data structures 304 are depicted as being connected to the replay component 301 via connection 306a and/or the cache 303 via connection 306b. The connection 306b between the cache 303 and the persistence data structures 304 indicates that in some embodiments the persistence data structures 304 store evictions from the cache 303. Thus, memory addresses/values that have been consumed by code is that being replayed are available either from the cache 303 (i.e., if it has been recently accessed) or from the persistence data structures 304 (i.e., if a memory address cached and then later evicted to the persistence data structures 304).

The connection 306a between the replay component 301 and the persistence data structures 304, however, indicates that replay component 301 can store memory addresses/values in the persistence data structures 304 using whatever scheme/rules it so chooses, and that the embodiments herein are not limited to storing cache evictions. For example, the persistence data structures 304 may store individual reads, including reads that would not make it into the cache 303. Thus, in some implementations, the persistence data structures 304 stores memory addresses/values that correspond to reads that are considered un-cached by the processor architecture being used.

As indicated above, embodiments include storing individual persistence data structures (e.g., 304a-304f) that correspond to individual sections of a trace file 109. To provide context for this concept, FIG. 4 illustrates an example trace file 400 that enables separate replay of individual sections trace data streams and that, in turn, enables the creation of an individual persistence data structure for each section.

Figure 4:
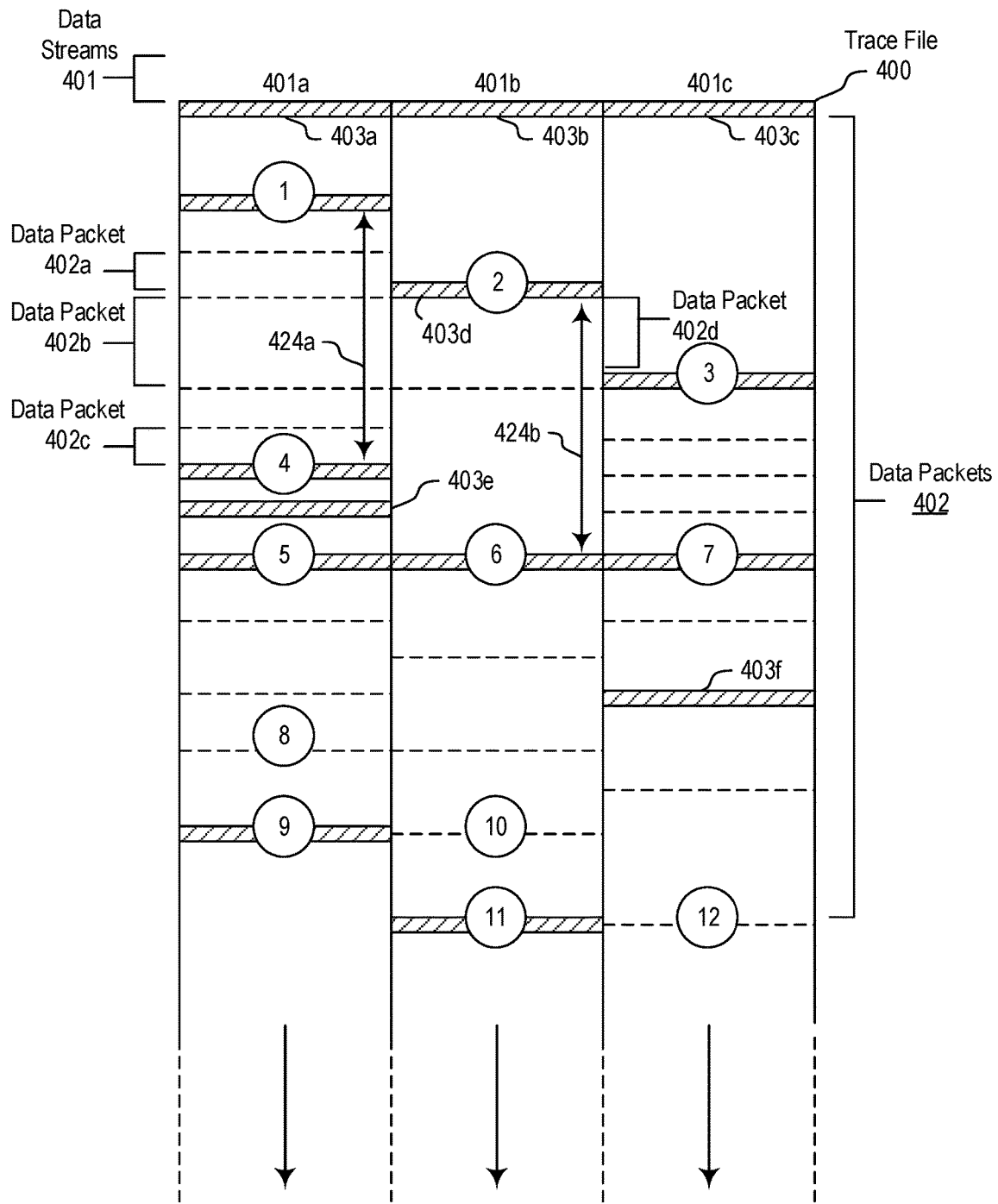
FIG. 4 illustrates an example trace file for use with a parallel multi-threaded recording.

In FIG. 4, the trace file 400 independently stores a log of execution of each of a plurality of executable entities (e.g., different threads, different executable entities corresponding to different portions of executable code 108a of the application 108, etc.) that are executing in parallel. For example, in FIG. 4, the trace file 400 represents the execution of three parallel threads of an application, in which each parallel thread executed a different processing unit 102a or processor 102 (including any combination of physical and/or virtual processing units/processors). Thus, in FIG. 4, the trace file 400 includes a separate data stream 401 for each processing unit 102a/processor 102—and thus for each executable entity of the application. The trace file 400 therefore includes three data streams 401a-401c—but it could include any number of data streams 401 depending on a number of processing units 102a available at the computer system 101 (whether they be in a single processor 102 or multiple processors 102) and/or a number of executable entities created by the application 108.

The data streams 401 may be included in a single file trace file 109, or may each be stored in different files. Each data stream 401 includes data packets 402 storing trace data that is usable by the trace replay component 301 to reproduce execution of the corresponding executable entity, by supplying appropriate recorded state data (e.g., register values, memory addresses and values, etc.) to executable code of the executable entity at appropriate times. Thus, using the information in the data streams 401, and using the actual executable code whose execution was traced, a full reproduction of execution of that code can be reproduced.

In FIG. 4, the data packets 402 are depicted as being separated by broken lines, and/or by key frames (which are discussed later). Thus, for example, three of the data packets in data stream 401a are specifically identified as data packets 402a-402c, and one of the data packets in data stream 401b is specifically identified as data packet 402d. As depicted, individual data packets 402 may be of differing sizes, depending on trace file implementation and on the particular data stored in each packet. Example data that may be included in a data packet includes information for identifying a code instruction executed, register values provided to that code instruction, memory addresses/values read, the side effects (e.g., resulting register values) of executing the code instruction, etc.

Using the format of trace file 400, the trace record component 106a records each data stream 401 independently during parallel execution of the code being traced. As such, the timing of the executable events recorded by the trace record component 106a into data packets in one data stream is generally independent from the timing of the events recorded by the trace recoding component 106a into data packets in another data stream (while accounting for a general ordering based on orderable events, discussed below). Thus, the replay component 203 can replay sections of each data stream 401 independently and in parallel. For example, the ordering of the individual events in data packet 402b are recorded separately from the individual events in data packet 402d. As such, the events in these trace sections can be replayed independent from each other, even though they originally occurred in parallel.

The trace file 400 also stores sequencing events that record the timing and sequence of execution of certain events that are "orderable" across the data streams 401. Orderable events may correspond to events by one thread that could affect execution of another thread, such as accessing shared memory. Thus, while the replay component 202 can generally replay each data stream 401 independently and in parallel, the orderable events to enforce a general ordering among sections of the traces. In some embodiments, orderable events are recorded using a sequencing number, comprising a monotonically incrementing number ("MIN"), which is guaranteed to not repeat. For example, the trace file 400 includes twelve sequencing numbers (depicted as circled numerals 1-12), each corresponding to the occurrence of different orderable events across data streams 401a-401c.

Expanding on the example of the independence of data packets 402b and 402d, FIG. 4 also illustrates a first section 404a of data stream 401a that is bounded by sequencing numbers 1 and 4, and a second section 404b of data stream 401b bounded by sequencing numbers 2 and 6. While it is known that the orderable event at sequencing number 1 occurred before the orderable event at sequencing number 2, that the orderable event at sequencing number 2 occurred before the orderable event at sequencing number 4, and that the orderable event at sequencing number 4 occurred before the orderable event at sequencing number 6, the particular ordering of individual events in section 404a versus the particular ordering of individual events in section 404b is not known. As such, sections 404a and 404b can be replayed in parallel with each other by the replay component 202.

Orderable events may be defined according to a "trace memory model," having defined orderable and non-orderable events that are used to identify how to store interactions across executable entities, such as threads. For example, orderable and/or non-orderable events may be defined based on how the threads interact through shared memory, their shared use of data in the shared memory, etc. Depending on implementation, a trace memory model may be weaker or stronger than a memory model used by the processor 102. The trace memory model used may be a memory model defined by a programming language used to compile code (e.g., C++14), or some other memory model defined for purposes of tracing.

A first example trace memory model may treat as orderable only kernel calls (from user mode), traps, and exceptions. This trace memory model would have low overhead, since these operations are relatively "expensive" is their own right, they are likely tracked anyway and provide a very coarse grained overview of ordering. A second example trace memory model may treat as orderable full fences (i.e., operations that are have both acquire & release semantics). Examples of such operations may include INTEL's "locked" instructions, kernel calls, exceptions, and traps. This memory model would provide enough ordering for nearly all cross-thread communication that happens in the process when the code uses "interlocked" types of primitives to communicate cross threads, which is common in operating such as WINDOWS from MICROSOFT CORPORATION). A third example trace memory model may treat all acquires and releases as orderable. This memory model may be suitable for processors based ARM instruction sets, because ARM does not treat most loads and stores as acquires or releases. On other architectures, such as from INTEL (in which a majority of memory accesses are acquires or releases), this would equate to ordering almost all memory accesses. A fourth example trace memory model may treat as orderable all memory loads. This would provide for strong ordering but may lead to decreased performance as compared to the other example memory models. The foregoing memory models have been presented as examples only, and one of ordinary skill in the art will recognize, in view of the disclosure herein, there a vast variety of memory models may be chosen.

The trace file 400 can also include key frames, which are depicted as shaded horizontal lines (e.g., such as particularly identified key frames 403a-403f). A key frame is a type of data packet that stores sufficient information to begin replay execution of an executable entity from the time of the key frame onward. For example, a key frame may store values for all relevant processor registers, information necessary to reproduce memory values from that point onward, etc. In FIG. 4, there is a key frame at the beginning of each trace data stream 401 (i.e., key frames 403a-403c), and a key frame at sequencing numbers 1-7, 9, and 11 (e.g., key frame 403d at sequencing number 2). Any number of key frames may be saved at any point in a data stream 401, and need not occur at the same time across data streams. For example, in addition to the foregoing key frames, FIG. 4 also depicts a key frame 403e occurring in data stream 401a between sequencing numbers 4 and 5, and a key frame 403f occurring in data stream 401c between sequencing numbers 7 and 12.

As mentioned above, key frames enable the replay component 202 to initiate replay of each trace data stream 401 at various points. For example, referring to data stream 401a, the replay component 202 can use key frames to initiate execution at different parts in the stream, including at the start of the stream (i.e., using key frame 403a), at sequencing numbers 1, 4, 5, and 9 (which, as depicted, each also correspond with a key frame), and at key frame 403e between sequencing numbers 4 and 5. Each section of a particular trace data stream that is bounded by key frames is independent from other sections of that trace, and can also be replayed in parallel. For example, key frames depicted in data stream 401a, define five such sections (i.e, a first section bounded by key frame 403a and the key frame at sequencing number 1, a second section bounded by the key frame at sequencing number 1 and the key frame at sequencing number 4, a third section bounded by the key frame at sequencing number 4 and key frame 403e, a fourth section bounded by key frame 403e and the key frame at sequencing number 5, and a fifth section bounded by the key frame at sequencing number 5 and the key frame at sequencing number 9). Each of these sections is independent from the others, and can be replayed in parallel with those sections.

Thus, independently recorded streams and orderable events/sequencing numbers enable portions of different data streams 401 to be replayed in parallel. In addition, key frames within individual data streams enable different sections of the same data stream to be replayed in parallel.

Referring now to FIGS. 2-4, in order to create individual persistence data structures (e.g., 304a-304f) based on trace file 400, the identification component 201 can identify individual trace sections 401 (e.g., sections between key frames and/or sequencing numbers), and identify one or more orderings among these sections (e.g., based on the sequencing numbers). The replay component 201 can then replay these trace sections, potentially in parallel, while the persistence component 203 stores encountered memory locations/values in a persistence data structure 304 corresponding to each trace section.

In addition, in order to return a memory value for an event of interest, the identification component 201 can identify an executable event of interest in the trace file 400, including a memory address of interest that corresponds to that executable event (e.g., a memory address read from or written to by that event). The identification component 201 can then identify independent trace sections among the trace data streams 401 that would execute prior to that event, and which persistence data structures (e.g., 304a-304f) correspond to those trace sections. The identification component 201 also can identify one or more orderings among these trace sections based, for example, on the sequencing numbers. The search component 204 then searches through the identified persistence data structures 304, in turn, using an ordering identified by the identification component 201, until the memory address of interest is encountered. The presentation component 205 then returns a value of the memory address of interest from the persistence data structure.

Of course, the persistence data structures 304 need not exist prior to a request for a memory value. For example, after the identification component 201 identifies independent trace sections among the trace data streams 401 that would execute prior to that event, the identification component 201 may determine that one or more of the corresponding persistence data structures 304 does not yet exist. Thus, the replay component 202 can then replay the identified trace sections to create the persistence data structures 304 on-demand.

Figure 5:
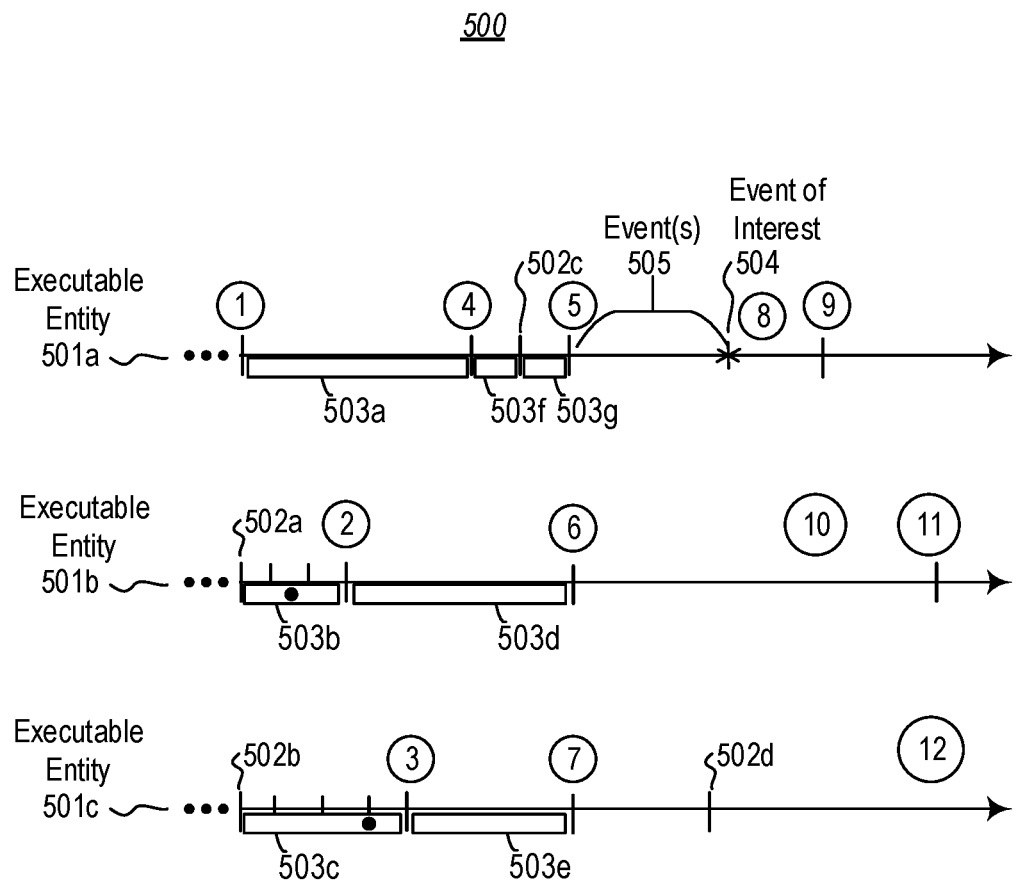
FIG. 5 illustrates an example timing diagram of replay of a trace file.

In order to provide a more concrete example, FIG. 5 illustrates an example timing diagram 500 of replay of trace file 400 of FIG. 4, with a specified event of interest 502. In particular, FIG. 5 illustrates a timeline showing replay of executable entity 501a as recorded by data stream 401a, replay of executable entity 501b as recorded by data stream 401b, and replay of executable entity 501c as recorded by data stream 401c. The timing diagram 500 also represents the occurrence of the orderable events of FIG. 4, including sequencing numbers 1-12. In FIG. 5, key frames are denoted with a vertical line. Thus, sequencing numbers 1-7, 9 and 11 are depicted in connection with a key frame. For brevity, key frames occurring at a sequencing number are identified herein by the corresponding sequencing number. For example, the key frame at the beginning of data stream 401a is referred to herein as key frame 1. The timing diagram 500 also represents four additional key frames 502a-502d not occurring along with a sequencing number, including key frames 502a and 502b at the beginning of data streams 401b and 401c, and key frames 502c and 502d occurring in data streams 401a and 401c (i.e., corresponding to key frames 403e and 403f in FIG. 4).

In this example, different trace sections are defined based on bounding key frames. For brevity, these sections are identified generally herein based on the two key frames bordering the sections, separated by a colon (:). Thus, for example, 1:4 refers the trace section that occurs between the key frame at sequencing number 1 and the key frame at sequencing number 4. Additionally, use of a square bracket (i.e., "[" or "]") indicates the endpoint as being inclusive, and use of a parenthesis (i.e., "(" or ")") indicates the endpoint as being exclusive. Thus, for example, [1:4) would denote section a section beginning with the instruction at sequencing number one, and ending with the instruction just prior to sequencing number 4.

As mentioned, the identification component 201 chooses one or more orderings among the trace sections. In some embodiments the chosen ordering defines a total ordering across all instructions in the trace file 400. Such an ordering may be chosen to ensure that a debugger can present a consistent view of program state (e.g., memory and registers) at all points in the trace, and no matter how the replay component 202 actually arrived at that point in execution (e.g., whether it performed a forward replay or a backwards replay to arrive at a breakpoint). However, other embodiments may present one of multiple valid orderings each time a different point in the trace is reached. While this would result in a different view of program state being presented at different times, such an implementation may decrease implementation complexity and result in increased replay performance compared to use of an ordering that defines a total ordering across all instructions. Additionally, as explained in more detail below, the chosen ordering also provides an ordering with which the search component 204 searches persistence data structures 304 (though in reverse order).

Whatever the chosen ordering, valid orderings place the trace sections in an order that would ensure that sequencing events are presented in proper order (i.e., in their monotonically increasing order), but do not need to reproduce the exact order in which all instructions executed at trace time. For example, in reference to FIG. 5, a valid ordering needs to ensure that the instruction at sequencing event three is presented prior to the instruction at sequencing event four— but does not need to ensure that the instruction just after sequencing event three is presented prior to the instruction just after sequencing event four, since they are in different threads (and since, as discussed previously, threads are recorded independently). Thus, for example, a valid ordering would place section 3:7 prior to trace section 4:502*c*.

A valid ordering need not include sections from all traces (e.g., because execution of one thread may not be relevant to obtaining desired data at a given point of interest), and multiple valid orderings could be chosen. One valid ordering using only trace data streams 401*a* and 401*c* that could be chosen to arrive at event of interest 504 is: [1:4], [502*b*:3], [4:502*c*), (3:7), [502*c*:5), and [5:9). Another valid ordering using all the trace data streams could be: [1:4), [502*a*:2), [502*b*:3), [2:6), [3:7), [4:502*c*), [502*c*:5), and [5:9). An example of an invalid ordering among trace sections is [1:4), [502*b*:3), [4:502*c*), [3:7), since this would present the event at sequencing number 4 as being visible, executed, and/or replayed prior to the event a sequencing number 3 (which would violate the trace memory model).

The replay component 202 need not actually perform the replay of the code sections according to this determined ordering. Instead, replay component 202 can execute the sections in any order, so long as the results obtained by the replay are presented according to the constraints of the determined ordering. Thus, the replay component 202 can queue the trace sections for replay in any order, and can execute them in any order at one or more processing units 102*a*, so long as the results are presented in the chosen ordering.

FIG. 5 also illustrates seven persistence data structures 503*a*-503*g* (referred to generally as persistence data structures 503), each of which corresponds to one of the trace sections. For example, persistence data structure 503*a* corresponds to section 1:4, persistence data structure 503*b* corresponds to trace section 502*a*:2, etc.

As described above, each persistence data structure 503 is created by the persistence component 203 while the replay component 202 replays the corresponding trace section. In some embodiments, the persistence component 203 writes into each persistence data structure 503 the memory addresses that are consumed by a processing unit 102*a* as that processing unit replays executable events in the corresponding trace section, as well as the memory values consumed at those addresses. A memory address/value may be consumed due to a memory read or a write operation by an executable event. As mentioned above, in some embodiments, a persistence data structure is created by recording evictions from cache 303, though it may be created in some other way.

In some embodiments, each persistence data structure 503 only records the most recently seen value at a memory address for a give trace section. Thus, for example, in trace section 502*a*:2 the same memory address is consumed two times (as indicated by the ticks), and in trace section 502*b*:3 that memory address is again consumed three times; however, there is only one entry for the memory address in each of persistence data structures 503*b* and 503*c* (as indicated by the solid circles in persistence data structures 503*b* and 503*c*). Those entries reflect the value seen the final time the address was consumed in that section (e.g., the farthest right memory address consumption in each section). Thus, in the case of subsequent encounters with the same memory address for a given trace section, the persistence component 204 overwrites a prior value associated with that address in the section's persistence data structure 503. As will become clear later, recording only the latest value seen brings about efficiencies during search by the search component 204.

Additionally, creation of a given persistence data structure 503 may be fully independent for that data structure, or may utilize information from another persistence data structure 503. For example, when creating persistence data structure 503*f* (based on section 2:6), it may be initially populated, at least in part, with values from persistence data structure 503*b* (based on section 503*b*:2), if it exists. Note that due to the independence of trace sections, and the use of parallel replay of trace sections across a plurality of processing units 102*a*, it may be that section 2:6 is actually replayed prior to section 503*b*:2, and that persistence data structure 503*b* thus does not yet exist when creating persistence data structure 503*f*.

FIG. 5 also includes a point of interest 504 in section 5:9 that consumes a memory address, such as the memory address already referred to in connection with sections 502*a*:2 and 502*b*:3 and persistence data structures 503*b* and 503*c*. Point of interest 504 may, for example, be a user-specified point of interest.

In some embodiments, when the value of a memory address seen by an event is requested, the events prior to that event are first consulted. For example, when attempting to return the value of the memory address consumed by event of interest 504, the replay component 202 may first replay events 505 prior to that event (i.e., starting at key frame 5) in section 5:9 in order to determine if the same memory address was consumed by those events. If it was, then the replay component 202 can simply return that value. Alternatively, if a persistence data structure already exists for section 5:9, the search component search component 204 can locate the value in that persistence data structure.

Additionally or alternatively, if the persistence data structures 503 are created based on recording evictions from the cache 303, the replay component may also consult the cache 303 to see if a cache line corresponding to the memory address. If it's in the cache 303, then the replay component 202 can return the value from the cache 303.

If, however, the memory address was not consumed by events prior to the event of interest in the same trace section, and/or if it is not in the cache 303 (in implementations in which the persistence data structures 503 are created based on cache evictions), the search component 204 searches persistence data structures 503 from prior trace sections, in reverse order based on the defined ordering, until a persistence data structure 503 recording the memory address is found. Thus, using the example ordering above of [1:4), [502*a*:2), [502*b*:3), [2:6), [3:7), [4:502*c*), and [502*c*:5), the search component 204 would initiate a search of persistence data structures 503 in the order of 503*g*, 503*f*, 503*e*, 503*d*, 503*c*, 503*b*, and 503*a*. In the illustrated case, the search component 204 would actually search persistence data structures 503*g*, 503*f*, 503*e*, 503*d*, and 503*c*, stopping at persistence data structure 503*c* where it obtains the value. Note that because the persistence data structures 503 record only the most recently seen value, there is no need to continue searching once a match is found. Thus persistence data structures 503*b* and 503*a* are not searched.

As mentioned above, persistence data structures 503 may be created prior to a request of a memory value, or may be created on-demand when a request is made. It will be appreciated that persistence data structures 503 may be persisted to durable storage (e.g., in persisted replay data 110). As such, the persistence data structures 503 may be created not only in a current debugging session, but may have been created from an entirely separate prior debugging session. In addition, embodiments may also discard persistence data structures 503 in order to preserve memory and/or disk space. For example, embodiments may discard the least recently created persistence data structures 503, the least recently accessed persistence data structures 503, etc.

Notably, in some embodiments, some of the persistence data structures 503 may be combinable. For example, adjacent persistence data structures that are separated by a key frame that does not correspond to a sequencing number may, in some embodiments, be merged or combined into a single structure. Thus, for example, persistence data structures 503d and 503e maybe combinable.

Figure 6:
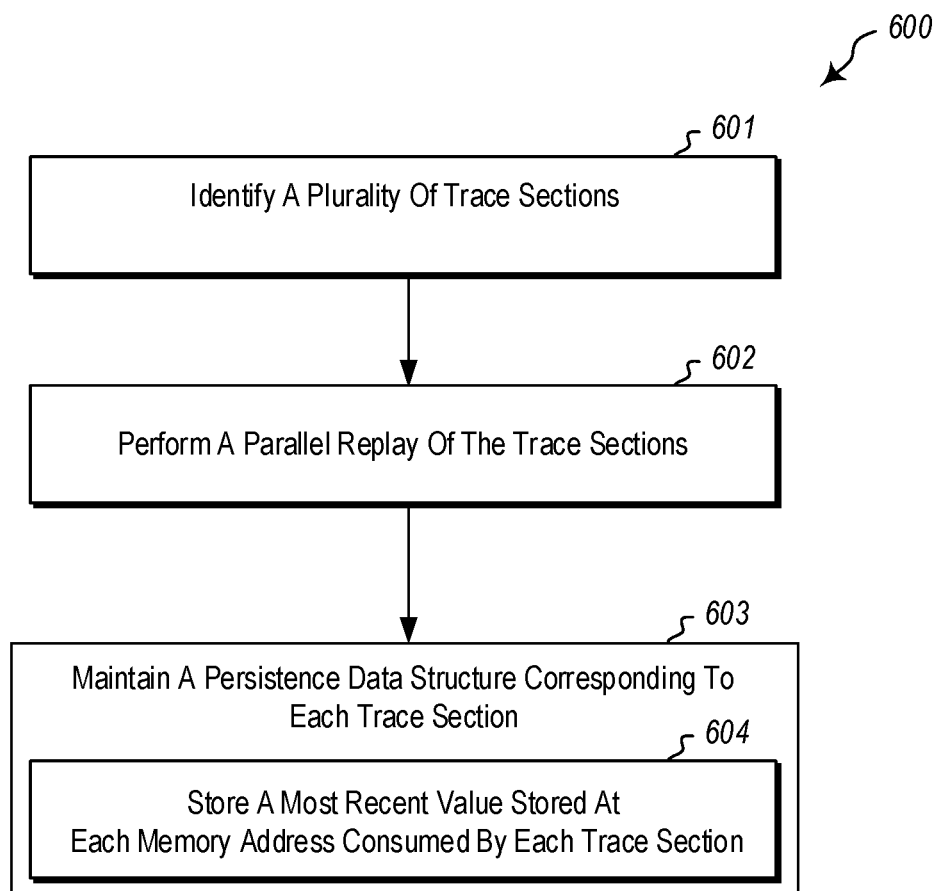
FIG. 6 illustrates a flow chart of an example method for preserving memory values during trace replay.

In view of the foregoing, FIG. 6 illustrates an example flow chart of a method 600 for preserving memory values during trace replay. FIG. 6 is described in connection with the components and data described in connection with FIGS. 1-5. While method 600 is illustrated as a series of acts, the particular ordering of the acts in the method 600 is not limited to the ordering shown.

As illustrated, method 600 includes an act 601 of identifying a plurality of trace sections. Act 601 can comprise identifying, from among a plurality of trace data streams, a plurality of trace sections that each represents one or more events executed by an executable entity over a period of time. For example, the identification component 201 can identify a plurality of trace sections (e.g., sections 1:4, 502a:2, 502b:3, 2:6, 3:7, 4:502c, 502c:5, and 5:9, as seen in FIG. 5) from among trace data streams 401 of trace file 400, to be replayed by the replay component 202. These trace sections may be selected based on routine replay of a trace file 400, or may be selected based on a specific request (e.g., for event of interest 504 at a debugging application) to obtain a value of a memory address for a particular event of interest.

Method 600 also includes an act 602 of performing a parallel replay of the trace sections. Act 602 can comprise performing a parallel replay of two or more of the plurality of trace sections at the plurality of processing units, including concurrently replaying each trace of the two or more trace sections at a different processing unit of the plurality of processing units. For example, the replay component 202 can queue a plurality of trace sections (e.g., sections 1:4, 502a:2, 502b:3, 2:6, 3:7, 4:502c, 502c:5, and 5:9) for replay by the processing units 102a. The processing units 102a can then replay each trace section independently, and in any order.

Method 600 also includes an act 603 of maintaining a persistence data structure corresponding to each trace section. Act 603 can comprise, while concurrently replaying each trace section at a different processing unit, maintaining a different persistence data structure corresponding to each trace section. For example, the persistence component 203 can maintain persistence data structures 304/503, including a different persistence data structure for each trace section that is being replayed.

As depicted, act 603 also includes an act 604 of storing a most recent value stored at each memory address consumed by each trace section. Act 604 can comprise, for each trace section, storing, in the trace section's corresponding persistence data structure, a record of each memory address consumed by the processing unit while replaying the trace section, and a most recent memory value stored at each memory address during replay of the trace section. For example, the persistence component 203 can record, in each persistence data structure 503, each memory address encountered during replay of the corresponding trace section along with values encountered. Also, each persistence data structure 503 includes only the most recently seen value at each address. Thus, as depicted in FIG. 5, trace sections 502a:2 and 502b:3 both encountered the same memory address multiple times, but their persistence data (503b and 503c) only each include a single entry for that address, storing the most recently seen value for that address. In some embodiments, the persistence component 203 maintains the persistence data structures 503 by recording the evictions from the cache 303.

Although not depicted, the method 600 may also include defining an ordering among the plurality of trace sections based at least on orderable events across the plurality of trace data streams. For example, the identification component 201 can identify an ordering among sections 1:4, 502a:2, 502b:3, 2:6, 3:7, 4:502c, 502c:5, and 5:9) based, at least in part, on the sequencing numbers. While these sections can be replayed individually and in any order by the processing units 102a, the results of the replay are presented based on the defined ordering, in order to provide a valid view of execution that can be used for later analysis, such as by search component 204.

Figure 7:
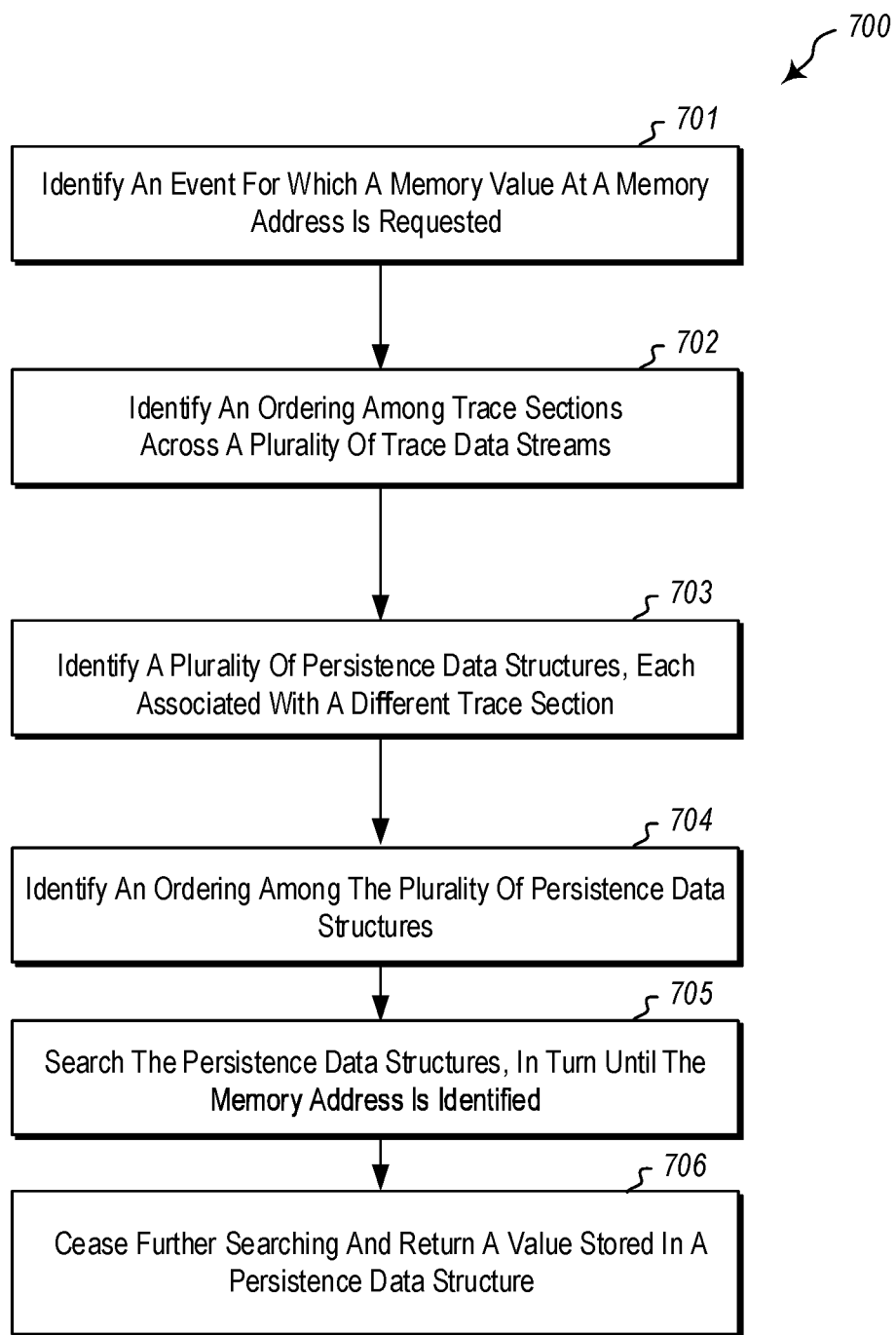
FIG. 7 illustrates a flow chart of an example method for returning a memory value during trace replay.

Additionally, FIG. 7 illustrates an example flow chart of a method 700 for returning a memory value during trace replay. FIG. 7 is described in connection with the components and data described in connection with FIG. 1-5. While method 700 is illustrated as a series of acts, the particular ordering of the acts in the method 700 is not limited to the ordering shown.

As illustrated, method 700 includes an act 701 of identifying an event for which a memory value at a memory address is requested. Act 701 can comprise identifying, in a particular trace data stream, an event for which a memory value at a memory address associated with the event is requested. For example, the identification component 201 can identify an event of interest 504 in data steam 401a of trace file 400. The event of interest may, for example, be an event of interest specified in a debugging application.

Method 700 also includes an act 702 of identifying an ordering among trace sections across a plurality of trace data streams. Act 702 can comprise identifying a defined ordering among a plurality of trace sections across a plurality of trace data streams that include the particular trace data stream. For example, the identification component 202 can identify an ordering among trace sections 1:4, 502a:2, 502b:3, 2:6, 3:7, 4:502c, 502c:5, and 5:9 of FIG. 5 based, at least in part the sequencing numbers.

Method 700 also includes an act 703 of identifying a plurality of persistence data structures, each associated with a different trace section. Act 703 can comprise identifying a plurality of persistence data structures that are each associated with a different trace section, and that occur prior to the location in the trace data stream based on the defined ordering. For example, the identification component 202 can identify persistence data structures 503a-503e, corresponding to trace sections 1:4, 502a:2, 502b:3, 2:6, 3:7, 4:502c, 502c:5, and 5:9.

Method 700 also includes an act 704 of identifying an ordering among the plurality of persistence data structures. Act 704 can comprise identifying an ordering among the plurality of persistence data structures based on the defined ordering. For example, the identification component 202 can identify an ordering of the persistence data structures 503, based on a reverse ordering of the trace sections. Thus, for example, the identification component 202 can identify an ordering of the persistence data structures 503 as: 503g, 503f, 503e, 503d, 503c, 503b, and 503a.

Method 700 also includes an act 705 of searching the persistence data structures, in turn, until the memory address is identified. Act 705 can comprise searching, in turn, and based on the identified ordering among the plurality of persistence data structures, one or more of the plurality persistence data structures until the memory address is identified in a particular persistence data structure. For example, the search component 204 can initiate a search for the requested memory address according to the ordering identified in act 704. In this case, the search component 204 would identify the requested memory address in persistence data structure 503c.

Method 700 also includes an act 706 of ceasing further searching and returning a value stored in a persistence data structure. Act 706 can comprise, when the memory address is identified in the particular persistence data structure ceasing further searching the plurality persistence data structures, and returning the value associated at the memory address, as stored in the particular persistence data structure. For example, upon identifying the requested memory address in persistence data structure 503c, the search component 204 can cease the search, and then the presentation component 205 can return/display the value stored for the address in persistence data structure 503c.

Although not depicted in FIG. 7, the method 700 may include one or more of (i) prior to searching the persistence data structures, replaying one or more instructions in the particular data stream that occurs between an orderable event and the event for which a memory value is requested to search for the memory address, or (ii) prior to searching the persistence data structures, searching a processor cache for the memory address.

The embodiments described herein preserve memory values during trace replay by maintaining plurality of persistence data structures during trace replay, which then provide an efficient mechanism returning a memory value, by progressively searching these persistence data structures only until the memory address of the requested memory value is encountered.

Although the subject matter has been described in language specific to structural features and/or methodological acts, it is to be understood that the subject matter defined in the appended claims is not necessarily limited to the features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes a plurality of processing units, for preserving memory values during trace replay, the method comprising:
   identifying, from among a plurality of trace data streams, a plurality of trace sections that each represents one or more events executed by an executable entity over a period of time;
   performing a parallel replay of two or more of the plurality of trace sections at the plurality of processing units, including concurrently replaying each trace of the two or more trace sections at a different processing unit of the plurality of processing units; and
   while concurrently replaying each trace section at a different processing unit, maintaining a different persistence data structure corresponding to each trace section, including, for each trace section:
      storing, in the trace section's corresponding persistence data structure, a record of each memory address consumed by the processing unit while replaying the trace section, and a most recent memory value stored at each memory address during replay of the trace section.

2. The method as recited in claim 1, further comprising defining an ordering across all instructions in the plurality of trace data streams, based at least on orderable events occurring across the plurality of trace data streams.

3. The method as recited in claim 1, wherein storing a record of each memory address and the most recent memory value stored at each memory address comprises storing processor cache evictions.

4. The method as recited in claim 1, wherein storing a record of each memory address and the most recent memory value stored at each memory address comprises storing a value of an un-cached read.

5. The method as recited in claim 1, further comprising merging at least two persistence data structures corresponding to adjacent trace sections on the same data stream.

6. The method as recited in claim 1, wherein identifying the plurality of trace sections comprises identifying at least one trace section bordered by at least one of: an orderable event, or a key frame.

7. The method as recited in claim 1, wherein maintaining a persistence data structure for at least one trace section comprises obtaining at least one memory value from another persistence data structure that corresponds to an adjacent trace section on the same data stream.

8. The method as recited in claim 1, further comprising persisting at least one persistence data structure to durable storage.

9. The method as recited in claim 1, wherein storing a most recent memory value stored at a memory address during replay of at least one trace section comprises overwriting a prior memory value at the memory address.

10. The method as recited in claim 1, wherein the plurality of processing units comprises at least one physical processing unit providing two or more virtual processing units.

11. A computer system, comprising:
    one or more processors; and
    one or more computer-readable storage media having stored thereon computer-executable instructions that, when executed at the one or more processors, cause the computer system to preserve memory values during trace replay, the computer-executable instructions including instructions that are executable to cause the computer system to perform at least the following:
       identify, from among a plurality of trace data streams, a plurality of trace sections that each represents one or more events executed by an executable entity over a period of time;
       perform a parallel replay of two or more of the plurality of trace sections at a plurality of processing units of the one or more processors, including concurrently replaying each trace of the two or more trace sections at a different processing unit; and
       while concurrently replaying each trace section at a different processing unit, maintain a different persistence data structure corresponding to each trace section, including, for each trace section:
          store, in the trace section's corresponding persistence data structure, a record of each memory address consumed by the processing unit while replaying the trace section, and a most recent memory value stored at each memory address during replay of the trace section.

12. The computer system as recited in claim 11, wherein the computer-executable instructions, when executed at the one or more processors, also cause the computer system to define an ordering among the plurality of trace sections based at least on orderable events across the plurality of trace data streams.

13. The computer system as recited in claim 11, wherein storing a record of each memory address and the most recent memory value stored at each memory address comprises storing processor cache evictions.

14. The computer system as recited in claim 11, wherein the computer-executable instructions, when executed at the one or more processors, also cause the computer system to merge at least two persistence data structures corresponding to adjacent trace sections on the same data stream.

15. The computer system as recited in claim 11, wherein identifying the plurality of trace sections comprises identifying at least one trace section bordered by at least one of: an orderable event, or a key frame.

16. The computer system as recited in claim 11, wherein maintaining a persistence data structure for at least one trace section comprises obtaining at least one memory value from another persistence data structure that corresponds to an adjacent trace section on the same data stream.

17. A method, implemented at a computer system that includes one or more processors, for returning a memory value during trace replay, the method comprising:
   identifying, in a particular trace data stream, an event for which a memory value at a memory address associated with the event is requested;
   identifying a defined ordering among a plurality of trace sections across a plurality of trace data streams that include the particular trace data stream;
   identifying a plurality of persistence data structures that are each associated with a different trace section, and that occur prior to the location in the trace data stream based on the defined ordering;
   identifying an ordering among the plurality of persistence data structures based on the defined ordering;
   searching, in turn, and based on the identified ordering among the plurality of persistence data structures, one or more of the plurality persistence data structures until the memory address is identified in a particular persistence data structure; and
   when the memory address is identified in the particular persistence data structure:
      ceasing further searching the plurality persistence data structures; and
      returning the value associated at the memory address, as stored in the particular persistence data structure.

18. The method of claim 17, further comprising, prior to searching the persistence data structures, replaying one or more instructions in the particular data stream that occur between an orderable event and the event for which a memory value is requested to search for the memory address.

19. The method of claim 17, further comprising, prior to searching the persistence data structures, searching a processor cache for the memory address.

20. The method of claim 17, wherein at least one trace section is bordered by at least one of: an orderable event, or a key frame.

* * * * *